Oct. 31, 1939.　　　　G. H. EVANS　　　　2,177,640
DISPLAY SIGN
Filed Sept. 21, 1937　　　4 Sheets-Sheet 1
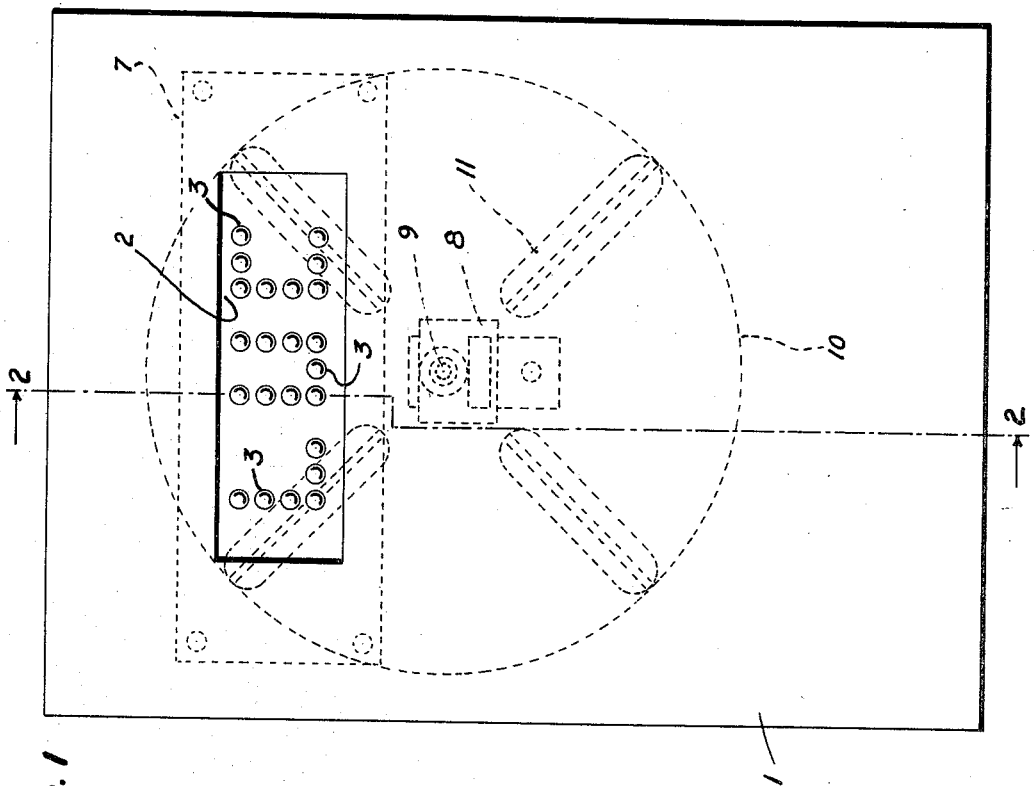
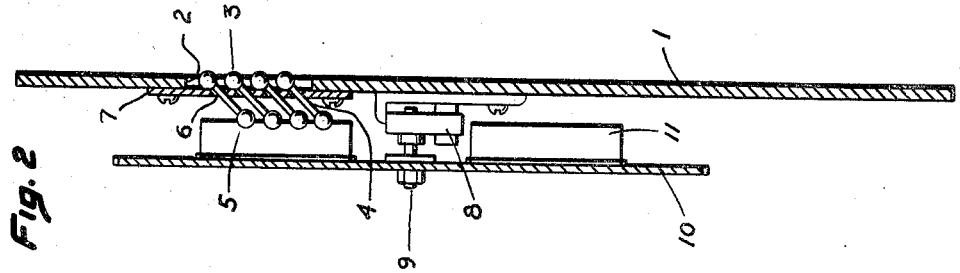
Inventor
GEORGE H. EVANS
By Richard H. Stevens
Attorney Oct. 31, 1939.　　　　G. H. EVANS　　　　2,177,640
DISPLAY SIGN
Filed Sept. 21, 1937　　　4 Sheets-Sheet 2
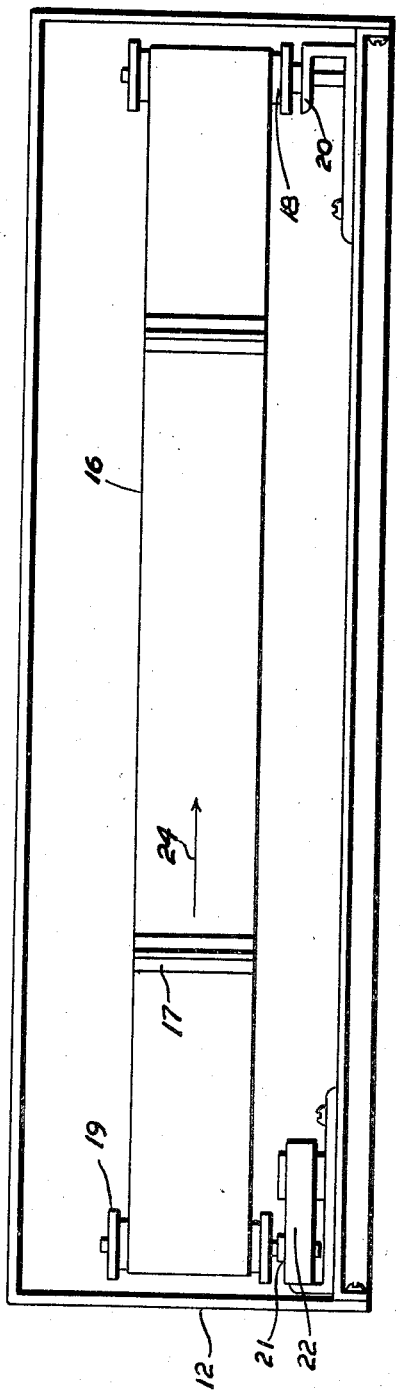
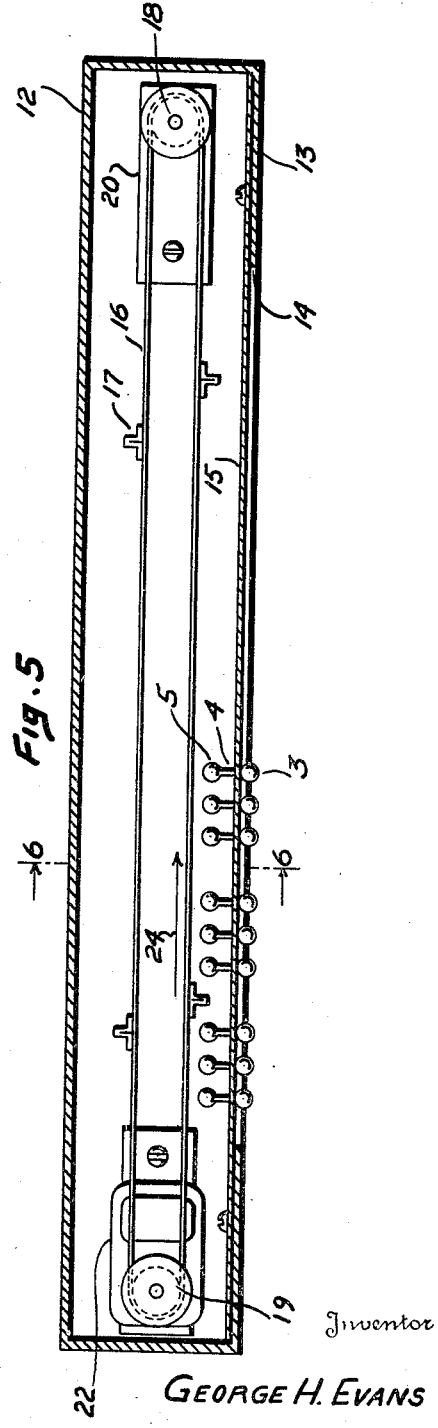
Inventor
GEORGE H. EVANS
By Richard K. Stevens
Attorney Oct. 31, 1939.  G. H. EVANS  2,177,640
DISPLAY SIGN
Filed Sept. 21, 1937  4 Sheets-Sheet 3
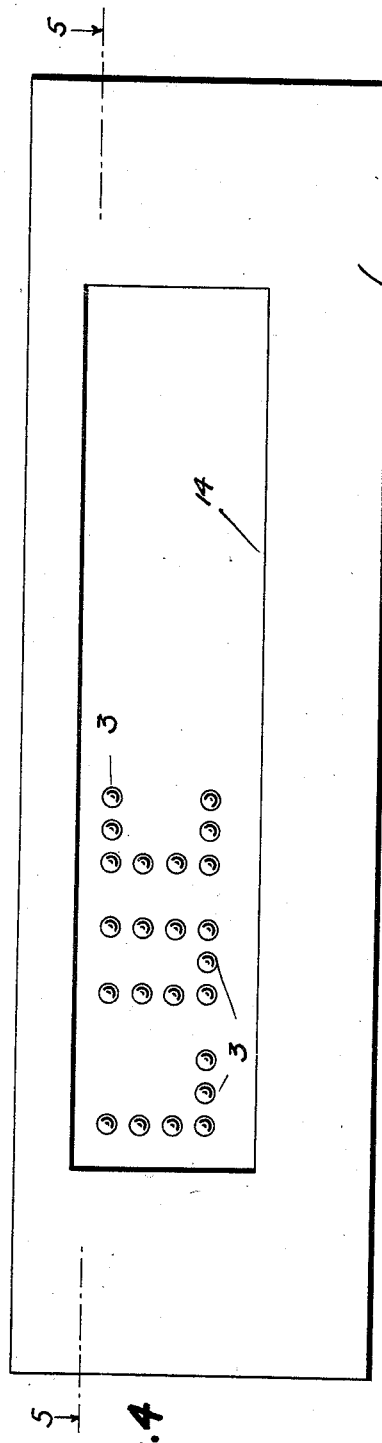
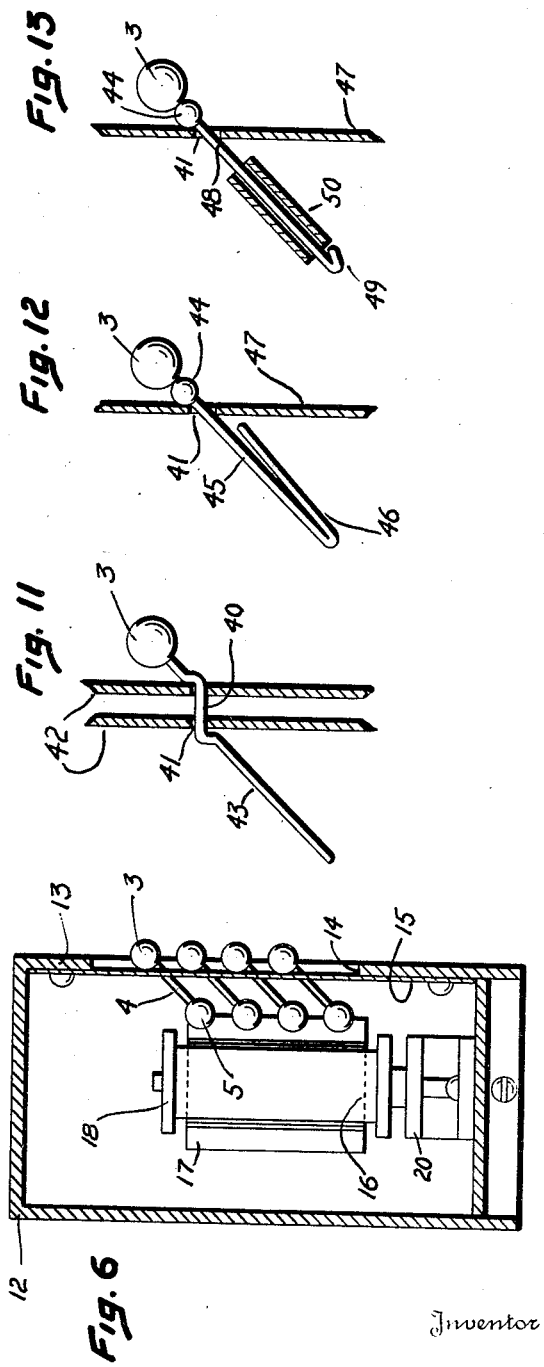
Inventor
GEORGE H. EVANS
By Richard K. Stevens
Attorney Oct. 31, 1939.   G. H. EVANS   2,177,640
DISPLAY SIGN
Filed Sept. 21, 1937   4 Sheets-Sheet 4
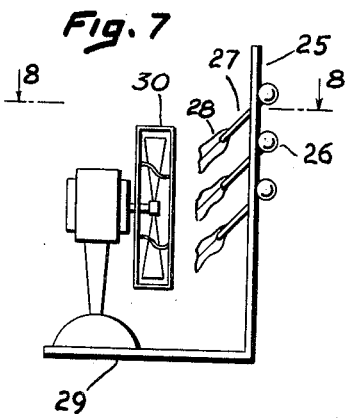
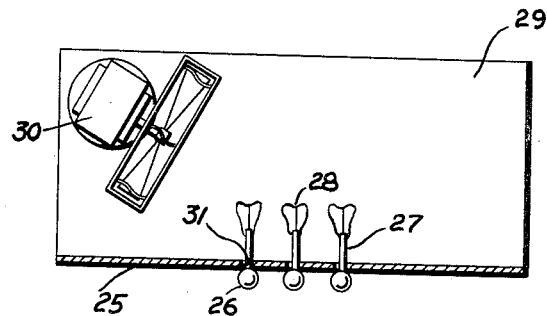
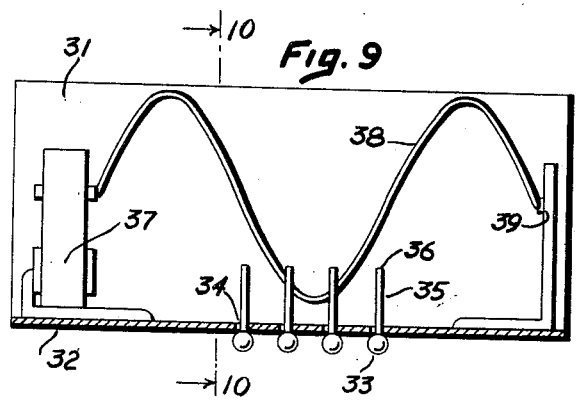
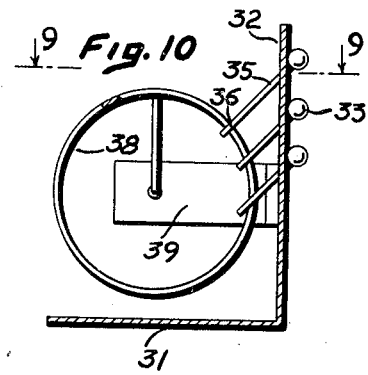
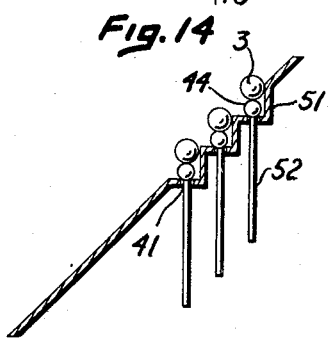
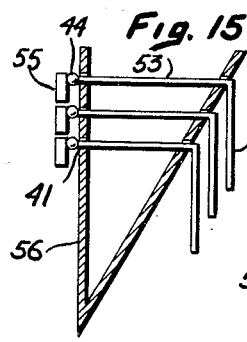
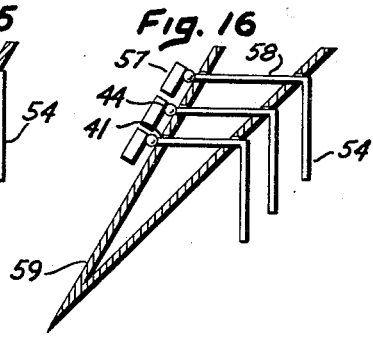
Inventor
GEORGE H. EVANS
By Richard K. Stevens
Attorney Patented Oct. 31, 1939

2,177,640

UNITED STATES PATENT OFFICE 2,177,640

DISPLAY SIGN

George H. Evans, Washington, D. C., assignor of one-half to Richard K. Stevens, Washington, D. C.

Application September 21, 1937, Serial No. 164,970

25 Claims. (Cl. 40—139)

This invention relates to display signs, and more particularly to such signs in which sufficient movement is imparted to elements thereof to attract the attention of persons in proximity thereto while the characters displayed by the sign are sufficiently stationary to readily convey to the observer the intended significance.

The desirability of utilizing signs including means for attracting the attention of the public thereto is so universally recognized that it is now common practice to produce extremely large and expensive electrical signs having novel designs as well as illuminating sequence and to produce, to a permissible extent, such novelties and illuminating effects in small signs, including those which are positioned within merchants' show windows, on sales counters and the like. Since the smaller signs have only a limited advertising value, it is not feasible to utilize expensive small signs so that many attempts have been made to create small signs which are relatively inexpensive and yet sufficiently attractive to warrant their use.

It is an object of this invention to provide a display sign which is inexpensive to produce and highly attractive as compared to previously known signs of generally corresponding sizes throughout the entire range from counter type signs to elaborate outdoor signs.

More specifically this invention contemplates the provision of a display device in which the insignia, whether in the form of letters or designs, are each composed of a plurality of periodically or continuously movable surface or insignia elements.

It is a further object of this invention to provide a device having generally stationary characters or letters or other insignia, while the elements, forming the outline or contour thereof, are periodically or continuously oscillated or shifted in their respective positions, thereby imparting sufficient motion to attract the attention of passers-by, while, at the same time, causing the insignia to remain in the original perfectly legible position.

In the production of small signs the invention contemplates the employment of surface elements in the form of beads or small balls of any color or shape, or small convex or flat discs with reflecting surfaces.

In the production of large signs in accordance with this invention, large ball or other surface elements may be utilized to form the generally stationary insignia and in the manufacture of illuminating or self-luminous signs the surface characters may be independent electric light bulbs or self luminous elements.

Other objects and advantages of the invention will become apparent from the following detailed description of certain preferred embodiments thereof, reference being had to the annexed sheets of drawings in which:

Figure 1 is a front elevation of a display sign formed in accordance with this invention with the driving mechanism for operating the surface elements being shown in dotted lines;

Figure 2 is a vertical sectional view taken on line 2—2 of Figure 1;

Figure 3 is a front elevation of a modified display sign formed in accordance with this invention with the front wall and display elements carried thereby being removed to show the interior mechanism;

Figure 4 is a front elevational view of the modification shown in Figure 3 with the front wall and surface elements in position;

Figure 5 is a longitudinal sectional view taken on line 5—5 of Figure 4;

Figure 6 is a vertical sectional view taken on line 6—6 of Figure 5;

Figure 7 is an end view of a sign formed in accordance with another embodiment of this invention wherein the surface elements are moved by an air current set up by an oscillating fan;

Figure 8 is a longitudinal sectional view taken along line 8—8 of Figure 7;

Figure 9 is a horizontal sectional view of a sign representing still another modification with a helical wire rotated upon its axis by any suitable power source, providing the operating mechanism for moving the surface elements;

Figure 10 is a transverse sectional view taken on line 10—10 of Figure 9; and

Figures 11, 12, 13, 14, 15 and 16 are vertical sectional views showing different methods of mounting the surface elements or heads, with the pendulum shanks thereof in the supporting panels or plates.

In Figures 1 and 2 of the drawings, 1 denotes a sign board of any suitable size or shape provided with a display space or window 2, in which the insignia, characters or letters are placed. Each insigne, character or letter is composed of a plurality of display elements such as beads, discs, balls, self-luminous objects or electric light bulbs 3 which are mounted to have a slight oscillatory, rotary or combined rotary and translatory motion while the letters are generally stationary, that is to say, the insignia, characters or letters do not revolve or have other exaggerated displacement from their original position on the sign board, so as to render the characters distorted.

The display elements 3 may be spherical or of any other shape, size or character desirable for the intended use of the sign. They may be disc-shaped, convex or concave and reflecting, self-luminous or transparent, either plain or multi-colored, in order to adapt them to various uses. When the sign is of sufficient size to permit it, the display elements may be electric light bulbs.

Display elements 3 are mounted upon shanks 4 which act as pendulums. The shank of each display element may be straight or may terminate at its lower end in a weighted portion 5 so as to insure that the pendulum hangs downwardly from its bearing 6, which comprises an opening in which it is freely movable in the supporting plate or panel 7. This opening 6 may be of any suitable configuration so as to adapt the surface element for the desired type of motion. Other methods of mounting the pendulums, which carry the display elements, in their supporting panels are shown in detail in Figures 11 to 16, inclusive, which will be hereinafter more fully described.

The supporting plate or panel 7 is preferably somewhat larger than the window or display space and is secured against the rear face of the sign board 1 in such a manner that the insignia, letters or characters formed by the display elements are fully exposed through the window or display space 2. Screws or other suitable means may be employed to secure the supporting plate 7 in place. Instead of mounting the display elements on a separate panel 7, they may be inserted directly on the sign board 1, but the former construction has, however, the advantages of an easy and quick change of characters.

The pendulum shanks 4 actuated by their weighted ends 5, hang downwardly in a more or less inclined position but spaced from each other in such a manner as to permit the weighted pendulum members to operate without mutual interference. In Figure 2 the shanks 4 are illustrated as being of substantially the same length but pendulums having shanks of different lengths may be used to vary the degree of rocking movement of any particular display member attached thereto.

On the rear of the sign board, positioned a suitable distance from the display space 2, any suitable power means 8 with suitable transmission means is mounted. The power means is operatively connected to a drive shaft 9 having mounted thereon a propeller 10 provided with blades 11 so positioned with respect to the weighted ends 5 of the pendulum members as to strike them as the propeller is rotated, thereby imparting rotary, oscillatory, or combined rotary and translatory motion to the display elements depending upon the arrangement of the apertures 6.

The blade members 11 may be made of some flexible material, such as rubber, canvas, felt, or the like, in order to cause a silent motion and soft impact with the weighted ends 5 of the pendulum display elements. Should it be desirable to use pendulum members having shanks 4 of different lengths as indicated above, the blade members 11 likewise may be of different lengths to adapt them to this modification of the invention. The blade members 11 may be inclined at various angles to impart different motions to the shanks on which the display elements are mounted.

When the propeller 10 is operated intermittently, an oscillatory, rotary, or combined rotary and translatory motion may be imparted to the display members depending upon the configuration of the bearing apertures 6 and also upon the inclination of the vanes 11. The motion thus imparted will continue until the impelling force of the vanes 11 has ceased and each pendulum member has regained its equilibrium, in which case the pendulum member remains stationary until further rotation of the propeller. However, should it be desired to move the display elements continuously, the propeller 10 may be either rotated continuously or the periods of rotation of the propeller may be so shortened that the pendulum members do not have time to come to equilibrium.

Other embodiments of the invention have been illustrated in Figures 3, 4, 5 and 6. In these figures the sign is in the form of a box-like structure 12 which contains the operating mechanism. The front face of the box-like structure 12 consists of a plate or board 13, which is attached thereto in any suitable manner to form a unit. The sign board 13 is provided with a window or display space 14 and to the rear of the sign board is secured the panel or supporting member 15 which carries the pendulum display members 3, 4 and 5 in such a manner as to expose them through the window or display space 14, to spell, for instance, the letters "Luc".

As in Figures 1 and 2, the shanks 4 extend inwardly in an operative position with respect to the impelling means 16, which comprises an endless belt with small preferably transversely directed blades or vanes 17 attached thereto in any suitable manner. In these figures the shanks 4 of the pendulum display members, as well as the vanes 17, are illustrated as being of substantially the same length, but may be varied in length to impart different rocking motions to the display elements.

The belt 16 is supported on one or more pairs of rollers 18, 19, carried on bearings 20, 21, in the box 12, in such a manner as to run substantially parallel to the supporting panel 15, as well as to the depending weighted ends of the display members. The belt is driven at a suitable speed by a motor 22 acting on roller 19, preferably from left to right, as indicated by arrow 24 in Figures 3 and 5. As the belt rotates the passing vanes 17 strike the weighted ends 5 of the display members to impart rotary, oscillatory or combined rotary and translatory motion thereto, depending upon the configuration of the bearing apertures and the inclination of the vanes 17.

As in Figures 1 and 2, continuous or intermittent motion may be applied to the display members by continuously or intermittently operating the conveyor belt 16 in the manner described in connection with propeller 10.

Instead of a single very narrow belt, as shown in these figures, a very wide belt may be used to move several rows of characters simultaneously. It is likewise possible to use a plurality of smaller belts to impart different motions to different banks of characters or to move each bank of characters at a different time.

With regard to the modifications illustrated in Figures 7 and 8, 25 represents a panel for supporting the pendulum display members 26, 27, and 28, while 29 denotes the base upon which the operating mechanism 30 is mounted. The front panel 25 constitutes a display surface for the pendulum members, the shanks 27 of which are mounted to move freely in their bearings 31 of any desired configuration. In this case the motive force for setting each pendulum display member into motion is derived from an oscillating fan 30, placed at one end of the structure in such a position that its air current is periodically directed against the ends 28 of the pendulum members. Should the air current derived from one fan be insufficient, a series of fans placed along the rows of pendulum members may be used.

In order to obtain the greatest effect from the air current, the ends 28 of the pendulum members are made quite wide so as to offer greater resistance thereto.

The pendulum display members 26, 27 and 28 may be operated intermittently in which case an oscillating fan 30 is used, whereas if it is desired to operate the display members continuously a stationary fan is employed. Here also the pendulum display members may be given a rotary, oscillatory, or combined rotary and translatory motion by employing a slot of a suitable configuration.

It will be noted that, while the fan 30 is illustrated as being in back of the pendulum members, it is to be understood that it may be located beneath the pendulum members or in any other desired position with respect thereto to alter the rocking motion of said display members.

Another modification of the present invention employing a different source of motive power for actuating the pendulum members is illustrated in Figures 9 and 10. The device there shown comprises a base 31 and a front wall 32 having a display surface through which the display elements 33 of the pendulum members are visible. The pendulum members are supported in individual apertures 34 in the front wall 32 and, as before, are composed of a head 33, shank 35 and end 36. At one end of the front wall 32 a motor 37 of any suitable kind is mounted. To the driving shaft of the motor one end of a helically coiled wire 38 is secured and its other end is mounted to revolve freely in a bearing 39 mounted on front wall 32 and located at the opposite end of the structure 31.

Once the motor 37 is started, the helical wire will revolve around its axis and impart a wave-like motion to the pendulum members, preferably in the direction from left to right. As in the prior embodiments of the present invention, the pendulum display elements 33, 35, 36 may be given a continuous or intermittent oscillatory, rotary or combined rotary and translatory motion by employing slots 34 of suitable configuration and/or by operating the helical wire in the manner described in connection with propeller 10 of Figures 1 and 2.

As before, the pendulum shanks 35 may be of different lengths.

Other preferred constructions of the pendulum display members are illustrated in Figures 11 through 16.

In Figure 11 the shank for the display head 3 is not straight, but has a cranked, horizontal upper portion 40 which fits freely in the bearing opening 41 of the double supporting panel 42. Below the crank portion 40 the shank terminates in a straight portion 43 bent downwardly and of sufficient length and weight to insure that the display member will act as a pendulum when set into motion.

The ball or head 3 of the pendulum display members 44, 45, 46 is spaced from supporting plate 47 by the interposition of a spherical restraining member 44, in the embodiment of Fig. 12. The shank 45 of the pendulum member is bent back upon itself as at 46 to prevent its displacement from bearing 41. It will now be evident that with an increase in the lever arm of the ball 3, its amplitude of motion will also be increased, thus producing a more effective and more noticeable display.

In Figure 13, as in Figure 12, the ball or head 3 is spaced from the supporting plate 47 by the interposition of a spherical restraining member 44, but in this case the shank 48 terminates in a small hook 49 which retains weight or sleeve 50 on the shank and maintains the pendulum in proper position.

Figure 14 shows an arrangement for mounting the display heads 3 in an inclined instead of a vertical plane. A stepped panel 51 having apertures 41 in each horizontal portion for the shanks 52 of the pendulum members is utilized for this purpose. Each pendulum member, as before, is composed of a display head 3, an intervening spherical restraining member 44 and a weighted shank 52 which in this case hangs in a vertical position.

Any of the previously described impelling means may be employed for operating the pendulum members illustrated in Figures 11 through 14.

The pendulum member in Figure 15 comprises an L-shaped shank 53, 54, an eccentrically mounted display head 55 in the form of a flat disc, and an auxiliary ball or washer 44 acting as a restraining member located on the shank between the bearing and said display head.

The pendulum members are mounted in a V-shaped panel 56 provided with horizontally directed apertures 41 in both the front and rear wall thereof which serve as bearings for the pendulum shanks 53, the weighted ends 54 of which hang down in a substantially vertical plane. The front wall of the panel 56 is arranged in a vertical position and the rear wall is inclined with respect thereto, thus permitting shanks 54 to be spaced sufficiently far apart to swing freely without interference from each other.

When the pendulum members are actuated by any of the previously described impelling means, the display discs 55 will oscillate with them in substantially the same vertical plane. However, should it be desirable to have the display discs 55 spaced at different distances from the panel 56 for the purpose of creating raised insignia, said display elements will, of course, oscillate in different vertical planes when the pendulum members are operated.

The display members 55 are shown eccentrically mounted in Figure 15 but they may be concentrically mounted to produce a different effect.

The pendulum members of Figure 16 are similar in every respect to those disclosed in Figure 15, except for the fact that the eccentrically mounted display members 57 are tilted with respect to the axis of the shanks 58. As in Figure 15 the display members 57 may be concentrically mounted should it be desirable to do so.

The supporting panel 59 also is similar to the one illustrated in Figure 15, but in this instance both the front and rear walls are inclined.

By this modification an extremely novel effect is created by reason of the fact that each display element 57 will describe a segment of a cone as it moves in response to the actuating means.

The display discs illustrated as being mounted to oscillate in a single inclined plane may also move in a plurality of inclined planes to produce varying effects.

It will be obvious that the invention may assume other forms than those described above which are to be considered as simply exemplary and not as limiting the scope of the invention.

I claim:

1. A display sign comprising a support, insignia mounted thereon in generally fixed position, said insignia being made up of a plurality of elements, each of said elements being freely mounted for independent bodily movement, and agitating means to impart such movement, the angular relation of the major and minor axes of said insignia remaining unchanged with respect to the support during said movement.

2. A display sign comprising a stationary background, insignia mounted thereon in generally fixed position including separate elements, each of said elements being freely mounted for independent bodily movement, and power-operated means for imparting motion to said elements, the angular relation of the major and minor axes of said insignia remaining unchanged with respect to said support during said movement.

3. A display sign comprising a stationary background, insignia mounted thereon in generally fixed position including elements mounted for independent bodily movement, and power-operated means comprising a rotor for imparting motion to said elements, the angular relation of the major and minor axes of said insignia remaining unchanged with respect to said support during said movement.

4. A display sign comprising a support, insignia mounted thereon in generally fixed position including elements mounted for independent bodily movement, and means for creating an air current for imparting motion to said elements, the angular relation of the major and minor axes of said insignia remaining unchanged with respect to said support during said movement.

5. A display sign comprising a support, insignia mounted thereon in generally fixed position including elements mounted for independent bodily movement, and means comprising a power-operated helically-wound wire for engaging and disengaging said elements, intermittently imparting motion to them.

6. A display device comprising a support, insignia mounted thereon in generally fixed position, said insignia being made up of a plurality of elements adapted for independent bodily movement and pendulum members mounted in said support for carrying said elements, and means for imparting motion to said pendulum members, the angular relation of the major and minor axes of said insignia remaining unchanged with respect to said support during said movement.

7. A display device comprising a support, insignia mounted thereon in generally fixed position, said insignia being made up of a plurality of elements adapted for independent bodily movement, and pendulum members mounted in said support for carrying said elements, each of said pendulum members being provided with an extension portion between its bearing and the surface element whereby the amplitude of motion of said element is increased, and means for imparting motion to said pendulum members.

8. A display device comprising a support, insignia mounted thereon in generally fixed position, said insignia being made up of a plurality of elements adapted for independent bodily movement, pendulum members mounted in said support for carrying said elements, each of said pendulum members being provided with an extension portion between its bearing and the element for increasing the amplitude of motion of said element, said extension portion comprising an auxiliary ball behind said element, and means for imparting motion to said pendulum members.

9. A display device comprising a support in the form of a stepped panel, insignia mounted thereon in generally fixed position, said insignia being made up of a plurality of elements adapted for independent bodily movement, pendulum members mounted in apertures in the horizontal stepped portions for carrying said elements, and means for imparting motion to said pendulum members.

10. A display device comprising a support, insignia mounted thereon in generally fixed position, said insignia being formed of a plurality of elements adapted for independent bodily movement, bent pendulum members mounted in said support for carrying said elements, said pendulum members defining an angle greater than 90°, and means for imparting motion to said pendulum members.

11. A display device comprising a support, insignia mounted thereon in generally fixed position, said insignia being made up of a plurality of elements adapted for independent bodily movement, straight pendulum members mounted in said support carrying said elements, and means for imparting motion to said pendulum members.

12. A display sign comprising a stationary background, insignia mounted thereon including independent rocking pieces having actuated pieces and counterbalancing levers projecting therefrom and power operated means engaging the levers for imparting movement to the rocking pieces, the levers of the vertically arranged rocking pieces extending downwardly in overlapped relation but spaced apart sufficiently to avoid contact one with the other.

13. A display sign comprising a support, insignia mounted thereon in generally fixed position, said insignia comprising a plurality of elements, and means associated with said elements to impart motion thereto, the angular relation of the major and minor axes of said insignia remaining unchanged with respect to said support during said movement.

14. A display sign comprising a support, insignia mounted thereon in generally fixed position, said insignia comprising a plurality of elements mounted for independent bodily movement, and means associated with said elements to impart motion thereto, the angular relation of the major and minor axes of said insignia remaining unchanged with respect to said support during said movement.

15. A display sign comprising a support, insignia mounted thereon in generally fixed position, said insignia comprising a plurality of elements, and means associated with said elements to intermittently impart motion thereto, the angular relation of the major and minor axes of said insignia remaining unchanged with respect to said support during said movement.

16. A display sign comprising a support, insignia mounted thereon in generally fixed position, said insignia comprising a plurality of elements mounted for independent bodily movement, and means associated with said elements to intermittently impart motion thereto, the angular relation of the major and minor axes of said insignia remaining unchanged with respect to said support during said movement.

17. A display sign comprising a support, insignia mounted thereon in generally fixed position, said insignia comprising a plurality of elements, and means associated with said elements to successively impart motion thereto, the angular relation of the major and minor axes of said insignia remaining unchanged with respect to said support during said movement.

18. A display sign comprising a support, insignia mounted thereon in generally fixed position, said insignia comprising a plurality of elements mounted for independent bodily movement, and means associated with said elements to successively impart motion thereto, the angular relation of the major and minor axes of said insignia remaining unchanged with respect to said support during said movement.

19. A display sign comprising a support, insignia mounted thereon in generally fixed position, said insignia comprising a plurality of elements, each of said elements being freely and universally mounted for independent bodily movement, and means associated therewith to impart such movement.

20. A display sign comprising a support, insignia mounted thereon in generally fixed position, said insignia comprising a plurality of elements, each of said elements being freely and universally mounted for independent bodily movement, and means associated therewith to impart such movement, the angular relation of the major and minor axes of said insignia remaining unchanged with respect to said support during said movement.

21. A display sign comprising a support, insignia mounted thereon in generally fixed position, said insignia comprising a plurality of elements, and power-operated means comprising transverse blades adapted to impart motion to said elements, the angular relation of the major and minor axes of said insignia remaining unchanged with respect to the support during the movement thereof.

22. A display sign comprising a support, insignia mounted thereon including independent rocking pieces having actuating and counterbalancing levers projecting therefrom, and power-operated means comprising transverse blades engaging said levers and imparting movement thereto, the angular relation of the major and minor axes of said insignia remaining unchanged with respect to the support during the movement thereof.

23. A display sign comprising a support, insignia mounted thereon including independent rocking pieces having actuating and counterbalancing levers projecting therefrom, and power-operated means comprising a rotor moving close to and by means of transverse blades engaging said levers and imparting movement thereto, the angular relation of the major and minor axes of said insignia remaining unchanged with respect to the support during the movement thereof.

24. A display sign comprising a support, insignia mounted thereon in generally fixed position including elements mounted for independent bodily movement, and means for creating a continuous air current for imparting motion to said elements, the angular relation of the major and minor axes of said insignia remaining unchanged with respect to the support during the movement thereof.

25. A display sign comprising a support, insignia mounted thereon in generally fixed position including elements mounted for independent bodily movement, and means for creating an intermittent air current for imparting motion to said elements, the angular relation of the major and minor axes of said insignia remaining unchanged with respect to the support during the movement thereof.

GEORGE H. EVANS.